(12) United States Patent
Suga

(10) Patent No.: US 6,617,570 B2
(45) Date of Patent: Sep. 9, 2003

(54) LIGHT SCANNING OPTICAL SYSTEM THAT INCLUDES CONFOCAL CONDENSING SYSTEM

(75) Inventor: Takeshi Suga, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/910,043

(22) Filed: Jul. 23, 2001

(65) Prior Publication Data

US 2002/0036256 A1 Mar. 28, 2002

(30) Foreign Application Priority Data

Jul. 26, 2000 (JP) .................................. 2000-225521

(51) Int. Cl.[7] ................................................ G02B 6/06
(52) U.S. Cl. .................... 250/227.2; 250/216; 359/205
(58) Field of Search ......................... 250/227.2, 227.26, 250/227.11, 216, 208.1, 234, 235; 359/205, 212, 215

(56) References Cited

U.S. PATENT DOCUMENTS

| 5,120,953 | A | | 6/1992 | Harris | |
| 6,292,287 | B1 | * | 9/2001 | Fujinoki | ...................... 359/212 |
| 6,433,910 | B2 | * | 8/2002 | Suga | ........................... 359/212 |

* cited by examiner

*Primary Examiner*—Que T. Le
(74) *Attorney, Agent, or Firm*—Arnold International; Bruce Y. Arnold

(57) ABSTRACT

A compact light scanning optical device having a wide field of view and high resolution is provided. The light scanning optical system is formed of a point light source, a confocal condensing optical system which collects light from the point light source and directs it to an object to be scanned, a scanning means for scanning the point light source, and a cover glass which includes an interior surface that is concave, with the cover glass being positioned between the confocal condensing optical system and the object to be scanned.

14 Claims, 9 Drawing Sheets

LIGHT SCANNING OPTICAL SYSTEM THAT INCLUDES CONFOCAL CONDENSING SYSTEM

BACKGROUND OF THE INVENTION

In recent years, light scanning optical systems have come into use which transmit a light beam generated by a light source device through an optical fiber, and which collect light from an object using a lens by scanning the area where the light is imaged so as to obtain image information of the object. In U.S. Pat. No. 5,120,953, a small scanning optical device is disclosed for observing, with magnification, living tissues. Light from an object is imaged and this light is then collected by scanning an end of an optical fiber at an image surface using an actuator. Collection of light from an object by scanning with scanning mirrors is also disclosed.

However, in a method of scanning that uses an end of an optical fiber as a light source, the design and manufacture of a condensing optical system having a high resolution and wide field of view for such a light source become difficult, since rays of light emitted in different directions from the light source at each scanning position need to be collected. Also, where the object to be observed has a low reflectivity, as is the case where the object to be viewed is living tissue, it is necessary to reduce stray light that is generated inside the optical system in order to increase the signal-to-noise ratio (hereinafter S/N ratio) so as to produce a satisfactory image of the object.

BRIEF SUMMARY OF THE INVENTION

The object of the present invention is to provide an optical device that enables high resolution and a wide field of view to be obtained using a light scanning optical device that is compact. In addition, it is desirable to provide a light scanning optical device which reduces stray light generated inside the optical system so as to provide a high S/N ratio in the image of the object.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
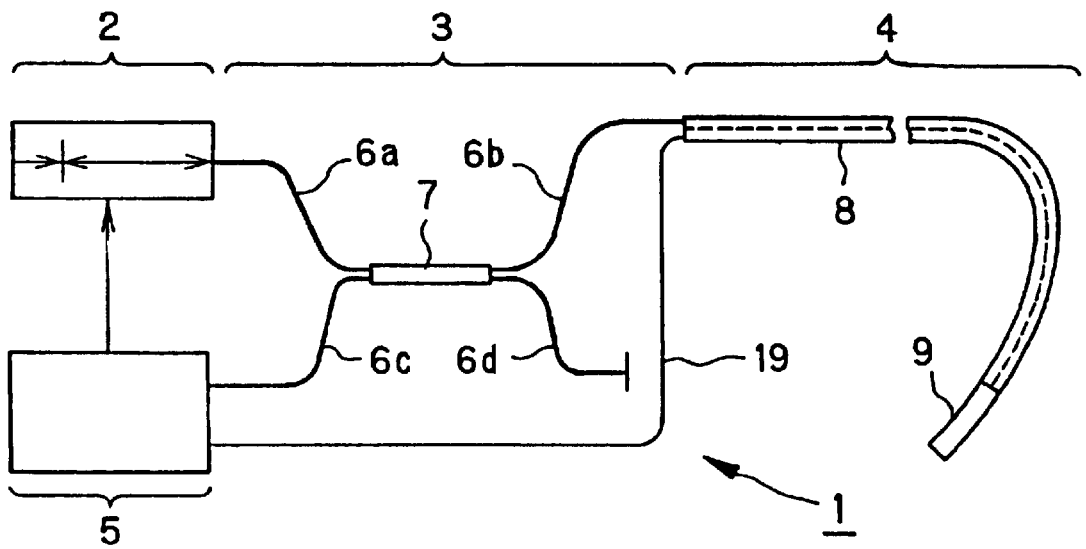
FIG. 1 is a schematic diagram of a light scanning optical system of the present invention.

The present invention is a light scanning optical system, more particularly, a light scanning optical system that is small in size, and yet provides high resolution at low cost.

A first feature of a light scanning optical system of the present invention is the use of a cover glass that includes at least one concave optical surface having negative refractive power. This aspect of the invention includes a point light source, a confocal condensing optical system which collects light rays from the point light source and directs them to a conjugate point, and which collects light rays reflected by an object at the conjugate point and directs them back to the point light source, a scanning means for scanning an image of the point light source by moving the point light source and the confocal condensing optical system as an integral unit about a point of rotation, and a cover glass located between the confocal condensing optical system and an object to be scanned, wherein an optical surface of the cover glass has negative refractive power and is concave. The relative locations of the point light source and the confocal condensing optical system are fixed. Therefore, the confocal condensing optical system is designed to collect light that is emitted from a single point that lies on the optical axis of the confocal condensing optical system. As a result, high resolution in the confocal condensing optical system of the present invention is easy to achieve and aberrations generated in the cover glass can be reduced by specially designing the cover glass.

By having the cover glass include a concave surface of negative refractive power, it becomes possible to design the cover glass and the confocal condensing optical system so that scanning rays are incident normal to the concave surface. Thus, such rays undergo no bending and substantially no aberrations are generated by the concave surface. In a sense, the concave surface of the cover glass and the confocal condensing optical system are made so that the optical axis of the confocal condensing optical system is normal to the concave surface. This minimizes the generation of aberrations as light rays are transmitted through the cover glass during scanning, and thus enables a wide field of view to be provided.

A second feature of the present invention is that, preferably, the following Condition (1) is satisfied by each surface of the cover glass during scanning:

$$|(\alpha)(NA)^4 (d) (\Delta N)| < 0.01° \text{ mm} \quad \text{Condition (1)}$$

where

α is the angle of incidence of the optical axis of the scanning beam onto a selected optical surface of the cover glass;

NA is the numerical aperture of the confocal condensing optical system on the object side;

d is the air conversion distance (in mm) from the selected optical surface of the cover glass, along the optical axis of the scanning beam, to the conjugate point of the point light source; and ΔN is the difference in refractive indexes of the media on opposite sides of the selected optical surface (i.e., the selected optical interface) of the cover glass.

By satisfying Condition (1) above, aberrations generated by the cover glass due to scanning can be controlled, and thus good optical performance can be maintained over a wide field of view.

A third feature of the light scanning optical system of the present invention is using a cover glass having its concave interior surface be aspheric. The aspheric surface shape is expressed by Equation (A) below:

$$Z = (y^2/r)/[1 + \{1-(K+1)(y/r)^2\}^{1/2}] + A_4 y^4 + A_6 y^6 + A_8 y^8 + A_{10} y^{10} \quad \text{Equation (A)}$$

where

Z is the length (in mm) of a line drawn from a point on the aspherical surface at distance y from the optical axis to the tangential plane of the aspherical surface vertex, r is the radius of curvature of the aspherical surface near the optical axis, y is the distance (in mm) from the optical axis, K is the eccentricity, and $A_4$, $A_6$, $A_8$, and $A_{10}$ are the 4th, 6th, 8th, and 10th aspherical coefficients.

By the concave surface of the cover glass being aspherical and satisfying Equation (A) above, the light rays of the scanning beam are made to be substantially normal to the curved interior surface of the cover glass, even for wide field angles of scan. Therefore, aberrations that otherwise would be generated by the cover glass due to scanning can be avoided.

A fourth feature of the present invention is having the exterior surface of the cover glass (i.e., the surface nearest the object) be a flat surface that is tilted with respect to the optical axis of the confocal condensing optical system. This construction prevents outgoing light that is reflected backwards at the exterior surface of the cover glass from mixing with, and thus degrading, the detected image signal reflected from the object being scanned.

A fifth feature of the present invention is having the optical axis of the confocal condensing optical system substantially match the optical axis of the scanning beam. Such a construction enables the confocal condensing optical system to achieve high resolution, since it images light from a single point source that is positioned stationary on the axis of the confocal condensing optical system. Also, this construction enables light from a point light source to be collected efficiently.

A sixth feature of the invention is that the end surface of the core of the optical fiber nearest the object to be scanned may be planar and, preferably, is oriented at an oblique angle to the longitudinal direction of the optical fiber near the end surface, with the oblique angle exceeding that which the numerical aperture of the optical fiber allows the optical fiber to convey without leakage. Further, the longitudinal direction of the optical fiber is oriented so that the exiting light beam that is refracted by the end of the optical fiber is substantially aligned with the optical axis of the confocal condensing optical system. This allows the outgoing light to be efficiently collected and directed toward the object to be scanned, and yet prevents light that is reflected toward the light source at the end surface of the optical fiber from being conveyed by the optical fiber to the controller 5. Thus, by forming the end surface of the optical fiber core at an oblique angle to the longitudinal direction of the optical fiber at the end surface, images with a high S/N ratio can be obtained since components of stray light that are reflected on the end surface of the optical fiber leak from the optical fiber and thus are not conveyed to the controller 5.

A seventh feature of the invention is, instead of using a single lens element for the confocal condensing optical system, plural lens elements are used in some embodiments of the invention. This enables aberrations that are introduced by the confocal condensing optical system to be reduced, and thus facilitates attaining a high resolution in the confocal condensing optical system.

An eighth feature of the invention is, when the confocal condensing optical system is formed of plural lens elements, two lens elements, one of positive refractive power and one of negative power, may be cemented together to form an achromatic lens, thereby reducing chromatic aberrations and enabling fluorescence observations to be made wherein the object is illuminated at one wavelength (the excitation wavelength) and is observed at another wavelength (the fluorescence wavelength).

A ninth feature of the invention is forming the confocal condensing optical system using only reflective optical elements so as to avoid producing chromatic aberrations. This is especially advantageous where fluorescence observations, as discussed above, are to be made. Further, since the light path is folded with such a construction, the distance from the end of the optical fiber to the object of interest can be shortened so as to make the confocal optical condensing system compact.

A tenth feature of the invention is forming the confocal condensing optical system using at least one reflective optical surface and a condensing lens. This construction also shortens the distance from the end surface of the optical fiber to the object by folding the light path, thereby enabling the light scanning optical system of the invention to be more compact.

An eleventh feature of the invention is forming the cover glass of plural optical elements. This construction allows aberrations generated by the cover glass to be favorably corrected. Also, the impact resistance of the cover glass can be increased using plural optical elements.

The light scanning optical system of the present invention will now be explained in general terms with reference to the drawings.

FIG. 1 is a schematic diagram of a light scanning optical apparatus that includes a light scanning optical system of the present invention. The light scanning optical apparatus 1 comprises a light source 2 for generating a light beam, a light transmitter 3 for transmitting the light beam, a light scanning probe 4 which receives light from the light transmitter 3 and directs it to an object via a flexible tube 8 and an end unit 9. The light scanning probe 4 also receives light reflected by the object and passes it to a controller 5 via the light transmitter 3. The controller 5 performs signal processing in order to detect light that has been returned from the object via the light scanning probe 4 so as to form images of the object, controls the light scanning means arranged in the light scanning probe 4, and so on. Light transmitter 3 is formed of optical fibers 6a, 6b, 6c and 6d for transmitting light to the scanning probe 4 via terminal coupler 7 which optically couples these light transmitting fibers to one another in a known manner.

Figure 2:
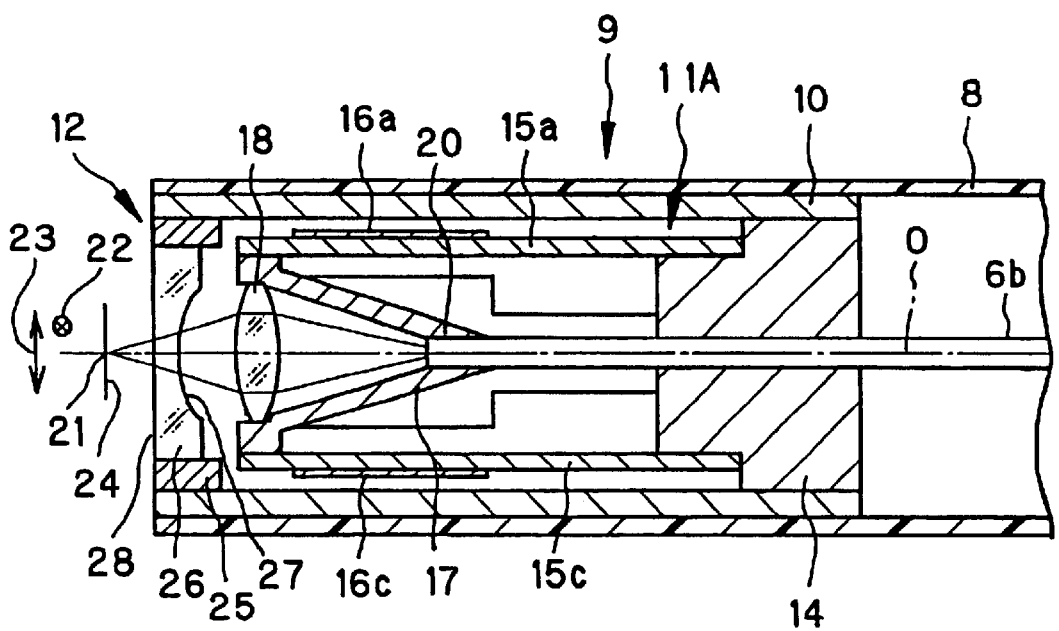
FIG. 2 is a sectional view of an end unit 9 used in the light scanning optical system shown in FIG. 1.

The end unit 9 is shown in FIG. 2. The present invention differs from the known prior art by employing end unit 9 positioned on the tip of the light scanning probe 4. The design and construction of the end unit 9 enables the various features as discussed above to be attained in the present invention. The end unit 9 is cylindrical in shape and rather inflexible. The end unit 9 is formed of an optical frame 10, one end of which is positioned at the end of flexible tube 8, an optical unit 11A which is arranged inside the optical frame 10, and a cover unit 12 arranged at the end of optical frame 10. The end of a slender optical fiber 6b is inserted into the flexible tube 8 so that it is in a fixed position with respect to the optical unit 11A. The light exiting from the end 20 of the optical fiber 6b is made to be convergent by the confocal condensing optical system 18, and is focused onto an object 21 via a cover glass 26. Reflected light returning from the object 21 is collected by the confocal condensing optical system 18 after passing through the cover glass 26 and is then directed into the optical fiber 6b. The collected light from the object is then passed to the controller 5 via the light scanning probe 4 and the terminal coupler 7.

The cover unit 12 is formed of a holder 25, and a cover glass 26 which is held by the holder 25. The holder 25 is fixed onto the end of the optical frame 10. This structure seals the end unit of the probe so that the probe is watertight. The external diameter of the end unit 9 should not be greater than 3.3 mm, thereby allowing the end unit to be inserted into the human body.

Figure 3:
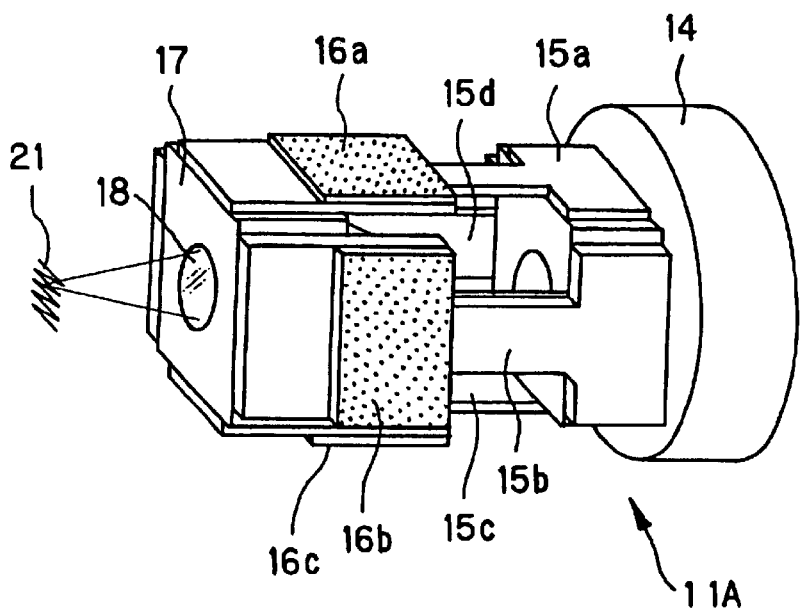
FIG. 3 is a perspective view showing details of the optical unit 11A shown in FIG. 2.

FIG. 3 is a perspective view showing details of the optical unit 11A shown in FIG. 2. The construction of optical unit 11A is as follows. The base 14 of optical unit 11A is fixed to optical frame 10 (FIG. 2). The rear end of each thin plate 15a, 15b, 15c and 15d is fixed to the base 14 so that thin plates 15a and 15c are parallel and on opposite sides of optical fiber 6b, and so that thin plates 15b and 15d are parallel, on opposite sides of optical fiber 6b, and perpendicular to the thin plates 15a and 15c, as illustrated in FIG. 3. Thin plates 15a and 15c, and thin plates 15b and 15d are formed of flexible metal that comprise pairs of plate springs, as illustrated. Because the thin plates bend easily, they allow the structure that is attached to the front ends of the thin plates to be directionally scanned in two directions, corresponding to the opposing directions of the two pairs of thin plates. Furthermore, as illustrated in FIG. 3, a tabular piezoelectric device 16a is attached near the front end of thin plate 15a, a tabular piezoelectric device 16b is attached near the front end of thin plate 15b, and so on, for each of the four thin plates 15a–15d. Each tabular piezoelectric device 16a–16d has its crystal axis aligned with its surface normal, as indicated. A cable 19 (FIG. 1) connects the controller 5 to electrodes attached to pairs of these opposing tabular devices so as to enable the structure supported by the front ends of the thin plates 15a–15d to be scanned in two directions via flexible tube 8.

Lens holder 17 is supported by the front ends of the thin plates 15a–15d. A confocal condensing optical system 18 and the end 20 of optical fiber 6b are fixed to the lens holder 17. The core portion of the end 20 of optical fiber 6b functions as a point light source and a pinhole aperture, thus enabling the optical system to function as a confocal optical system.

By applying electric driving signals to the piezoelectric devices 16a–16d, the combinations of the piezoelectric devices 16a–16d and the thin plates 15a–15d cause the optical axis of the confocal condensing optical system 18 and the end 20 of optical fiber 6b (both held by holder 17) to be scanned as an integral unit in two directions. In other words, by driving the piezoelectric devices 16a–16d, the end unit 9 can be made to perform a confocal scan of scanning surface 24 in both the horizontal direction (X-axis direction) and in the longitudinal direction (Y-axis direction). This scanning surface is a plane which is nearly normal to the direction of the optical axis of the end unit 9 of the optical probe. Where this kind of optical probe is used, the exterior surface 28 of the cover glass 26 may be positioned at a fixed position on the surface of an object to be observed, and two dimensional image scanning of an object at a specified depth (i.e., at the position of surface 24) can be obtained.

The numerical aperture of the object side of the confocal condensing optical system 18 is preferably not less than 0.4. This allows excellent images of the nucleus of a cell as well as images of cell membranes to be obtained for living tissues. The working distance (i.e., the distance between the focal point 21 and the exterior surface 28 of the cover glass 26) should be less than about 200 μm. If the working distance is not less than about 200 μm, the light scattering effect on living tissues degrades the imaging performance, making it difficult to obtain high quality images.

Figure 4:
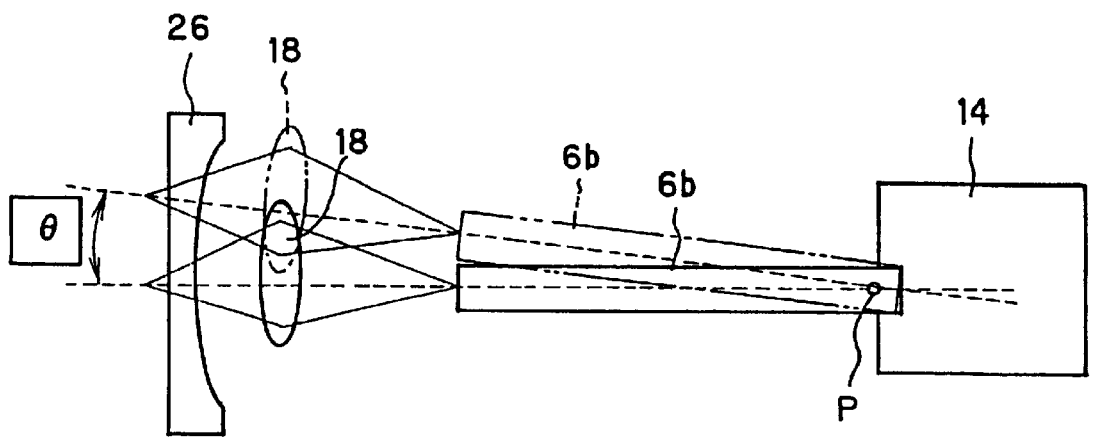
FIG. 4 is a side sectional view that illustrates how the optical axis of a confocal condensing optical system tilts vertically about a center of rotation P when performing a two dimensional scan.

As described previously, the end 20 of the optical fiber 6b and the confocal condensing optical system 18 are held stationary with one another by a holder 17 and are scanned as an integral unit. Thus, the optical axis of the integral unit tilts about a center of rotation P (FIG. 4) positioned at the distal end of base 14. Therefore, the optical axis of the confocal condensing optical system 18 tilts about this point in two dimensions when scanning an object two-dimensionally.

Various embodiments of the invention will now be discussed in greater detail.

Embodiment 1

Figure 5:
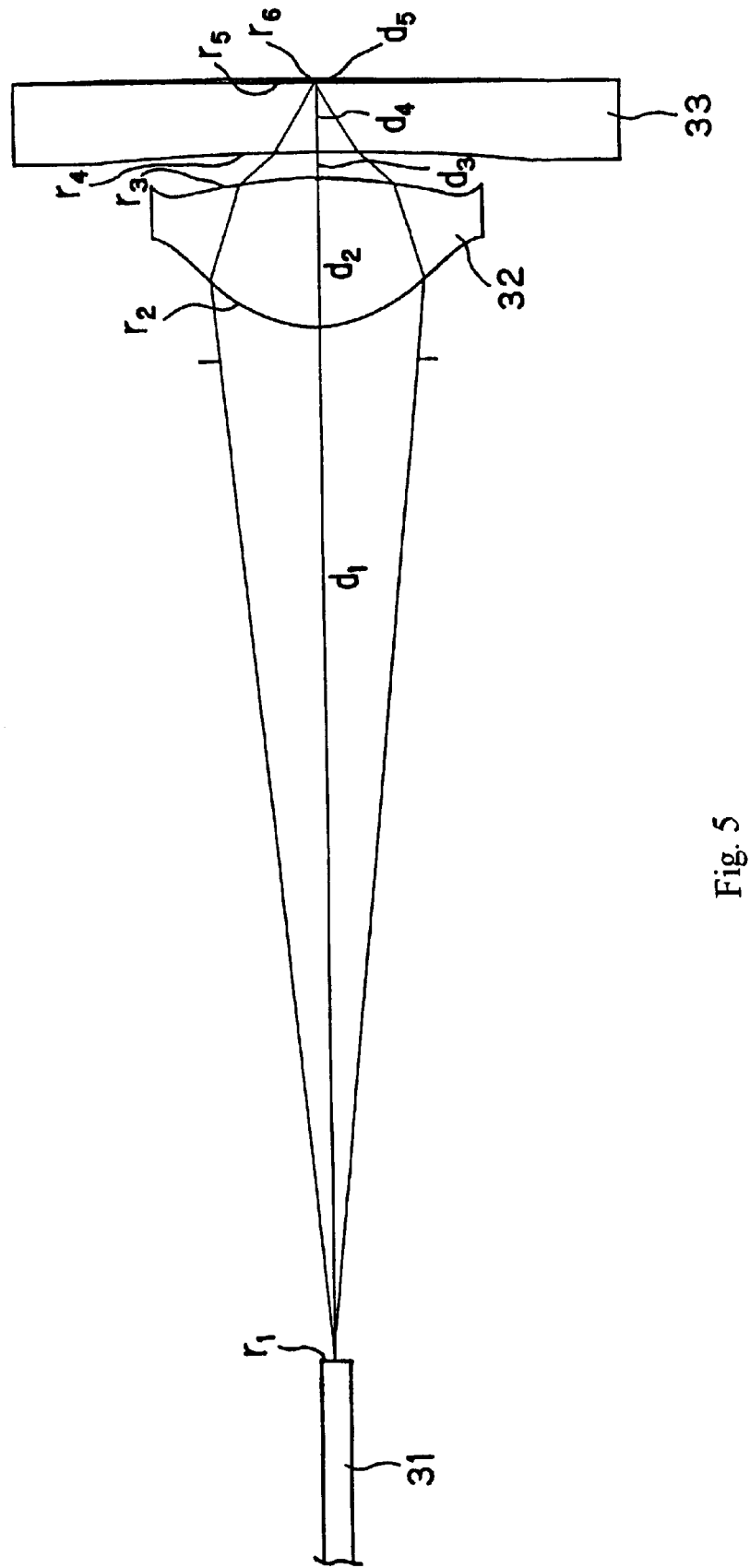
FIG. 5 illustrates light paths in the confocal condensing optical system according to Embodiment 1 of the present invention.

FIG. 5 illustrates light paths in the light scanning optical system according to Embodiment 1 of the present invention, which is designed for the wavelength of the point light source being 400 nm, and the numerical aperture NA of the confocal condensing optical system 32 being 0.75 on the object side. The end of the optical fiber 31 has a radius of curvature $r_1$ (which in this case is infinity, as shown in Table 1 below), and the confocal condensing optical system 32 has surfaces with radii of curvature $r_2$ and $r_3$, as shown. The cover glass 33 has an internal concave surface with a radius of curvature $r_4$ and an external surface with a radius of curvature $r_5$. Light from the optical fiber core is converged by the combination of the confocal condensing optical system 32 and cover glass 33 so as to focus at a desired point, either at the surface of an object or at a desired depth within an object that is positioned immediately adjacent the cover glass 33. The end surface (of radius of curvature $r_1$) of optical fiber 31 in this embodiment is arranged normal to the longitudinal direction of optical fiber 31 near the end surface, and the confocal condensing optical system 32 is arranged so that its optical axis is aligned with the longitudinal direction of optical fiber 31 near its end surface. Therefore, the confocal condensing optical system 32 needs only to be designed to collect rays from the end of optical fiber 31, which forms essentially a pinhole-sized aperture and is fixed in position relative to the confocal condensing optical system 32. This allows the confocal condensing optical system 32 to have a high resolution and low cost.

Table 1 below lists the surface number #, beginning with the end surface of the optical fiber and proceeding in order to the object, the radius of curvature r (in mm) of each surface near the optical axis, the on-axis surface spacing d between surfaces, as well as the index of refraction $n_d$ and Abbe number $\upsilon_d$ (at the d-line) of the optical elements of Embodiment 1, with $n_{d5}$ being the index of refraction of the object and $\upsilon_{d5}$ being the Abbe number of the object. Those surfaces with a * to the right of the surface number # are aspheric, with the surface curvature being given by Equation (A) above, as defined by the aspheric constants listed in the lower portion of Table 1.

TABLE 1

| # | r | d | $n_d$ | $U_d$ |
|---|---|---|---|---|
| 1 | ∞ | 4.644261 | | |
| 2* | 0.54882 | 0.643184 | 1.81474 | 37.03 |
| 3* | -1.25520 | 0.110668 | | |
| 4 | -10.00000 | 0.300000 | 1.51630 | 64.10 |
| 5 | ∞ | 0.012612 | 1.33304 | 55.79 |
| 6 | ∞ (focal point) | | | |

Aspheric constants:

| Surface # 2 | | Surface #3 | | |
|---|---|---|---|---|
| K | = -0.971934 | K | = | 0.000000 |
| $A_4$ | = 0.103053 | $A_4$ | = | $0.145293 \times 10^1$ |
| $A_6$ | = 0.466166 | $A_6$ | = | $-0.531206 \times 10^1$ |
| $A_8$ | = $-0.261750 \times 10^1$ | $A_8$ | = | $0.767565 \times 10^1$ |
| $A_{10}$ | = 0.000000 | $A_{10}$ | = | 0.000000 |

In this embodiment, the distance from the center of rotation P (FIG. 4) of the scanning means to the interior surface of the cover glass 26 is 10.0 mm. Moreover, the value of $r_4$ is -10.00000 mm. Therefore, in this embodiment, the center of curvature of the interior surface of the cover glass is substantially at the same location as the center of rotation P of the scanning means as it scans the image of the point light source in two dimensions to image features of an object of interest, i.e., either the surface of an object or at a specified depth.

Table 2 below shows the optical performance of Embodiment 1 at various scan angles θ. Rather than performing a straight line scan (i.e., in x-y coordinates), the scan may instead be circular arcs of varying radii of curvature. The optical performance values listed are the RMS wave surface aberration (in units of wavelength λ) at scan angles θ of 0.0°, 0.5°, 1.0°, and 1.5°. If the wave surface aberration value exceeds 0.07, degradation of resolution begins. The image of the point light source (i.e., the scanning spot) is scanned wherein scanning arcs of the scanning spot have radii of curvature of: 90 μm at θ=0.5°, 180 μm at θ=1.0°, and 270 μm at θ=1.5°.

TABLE 2

| θ: | 0° | 0.5° | 1° | 1.5° |
|---|---|---|---|---|
| RMS wave surface aberration (λ): | 0.012 | 0.012 | 0.016 | 0.03 |

In comparison, Table 3 below lists the optical performance where the cover glass is, instead, a plane-parallel glass plate (i.e., $r_4$ and $r_5$ equal infinity), and where, in order to improve the optical performance where the scanning angle θ equals 1.0°, the spacing $d_3$ (from the lens surface to the cover glass) of the surface #3 has been changed to 0.099517 mm, and the spacing $d_5$ (the working distance) of the surface #5 has been changed to 0.024570 mm. In this case, the angle α (i.e., the angle between the optical axis of the confocal condensing optical system 32 and the normal to the cover glass 33) is equal to the scanning angle θ.

TABLE 3

| θ: | 0° | 0.5° | 1° | 1.5° |
|---|---|---|---|---|
| RMS wave surface aberration (λ): | 0.011 | 0.102 | 0.214 | 0.334 |

Therefore, as the optical axis of the confocal condensing optical system is tilted to the cover glass surface (the surface #4) according to the scanning angle, asymmetric aberrations such as coma and astigmatism are generated at the cover glass surface (surface #4), and the optical performance is significantly degraded.

As explained above, in this embodiment, the interior surface of the cover glass 33 is spherical, with its center of curvature positioned substantially at the point P, which is the center of rotation of the scanning means. Thus the spherical surface is always substantially normal to the optical axis of the scanning beam. Therefore, asymmetric aberrations such as coma and astigmatism are not generated during scanning, which allows the system to provide good optical performance over the entire scanning field. However, it is not necessary that the center of curvature of the interior surface of the cover glass 33 be precisely positioned at the center of rotation P of the scanning means, as long as the above Condition (1) is satisfied.

Table 4 below shows the values of the product on the left side of Condition (1) for various values of scan angle θ. The listed values are for surfaces #4 and #5 of Embodiment 1, as well as for these same surfaces where a plane-parallel glass plate has been substituted for the cover glass of Embodiment 1. On surface #4 (a spherical surface) of this embodiment, the Condition (1) is satisfied because of θ being equal to zero, since the optical axis of the collective optical system is always aligned with the surface normal of the spherical surface #4. Also, on surface #5 (a flat surface) Condition (1) is satisfied, because the value of "d" is sufficiently small. As a result, good optical performance can be maintained when scanning. On the other hand, on the surface #4 (a flat surface) in the case where a plane-parallel glass plate is substituted for the cover glass, Condition (1) is not satisfied because the scanning angle θ and the angle α are equal. As a result, optical performance may be significantly degraded when scanning in the case where a plane-parallel glass plate is substituted for the cover glass.

TABLE 4

| θ: | 0° | 0.5° | 1° | 1.5° |
|---|---|---|---|---|
| Value of: $|(\alpha)(NA)^4(d)(\Delta N)|$ for surface #4 in Embodiment 1: | 0 | 0 | 0 | 0 |
| Value of: $|(\alpha)(NA)^4(d)(\Delta N)|$ for surface #5 in Embodiment 1: | 0 | $2.74 \times 10^{-4}$ | $5.48 \times 10^{-4}$ | $8.22 \times 10^{-4}$ |
| Value of: $|(\alpha)(NA)^4(d)(\Delta N)|$ for surface #4 if flat plate substituted for cover glass 33 in Embodiment 1: | 0 | 0.01765 | 0.0353 | 0.05295 |

TABLE 4-continued

| θ: | 0° | 0.5° | 1° | 1.5° |
|---|---|---|---|---|
| Value of: $\|(\alpha)(NA)^4(d)(\Delta N)\|$ for surface #5 if flat plate substituted for cover glass 33 in Embodiment 1: | 0 | $5.34 \times 10^{-4}$ | $10.7 \times 10^{-4}$ | $16.0 \times 10^{-4}$ |

Embodiment 2

Figure 6:
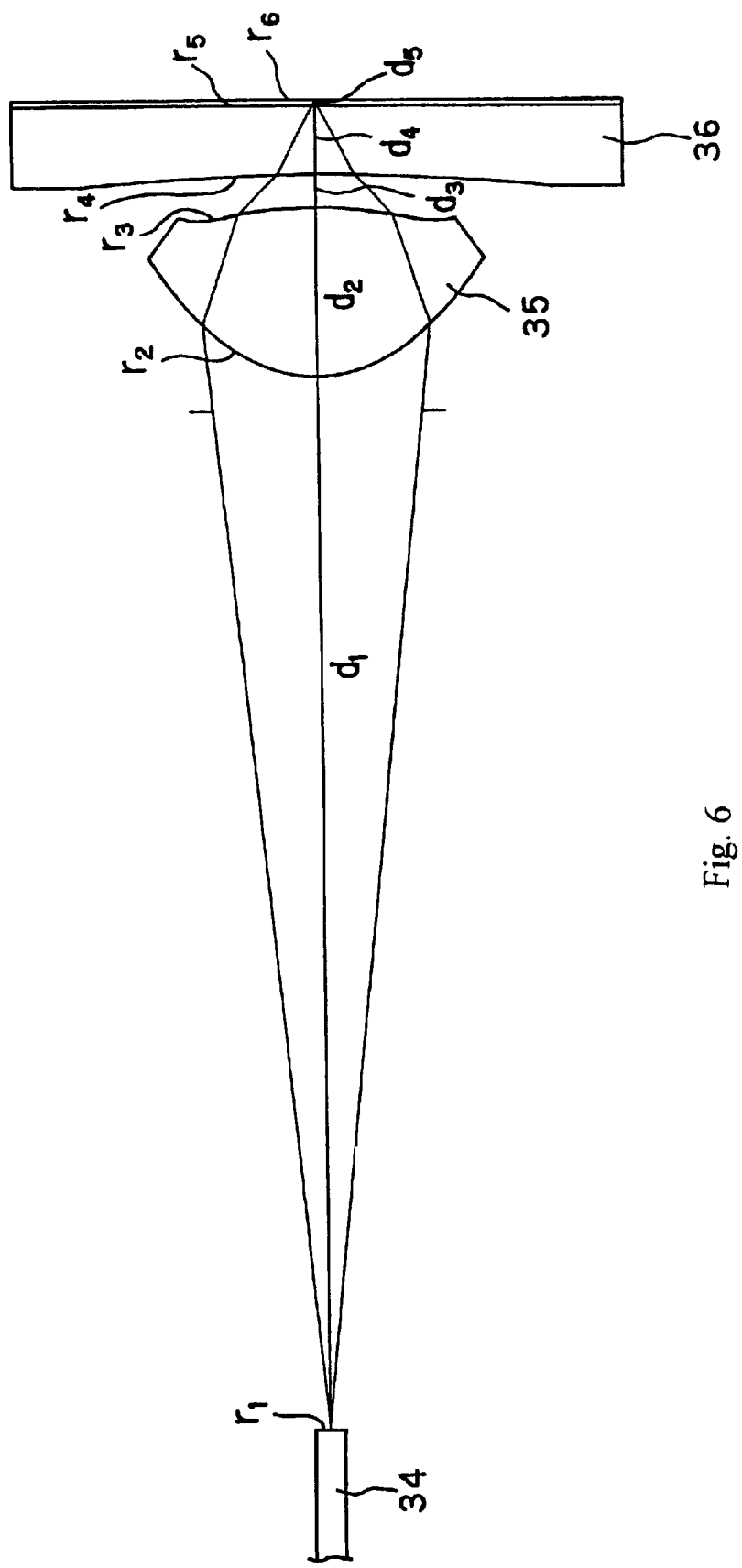
FIG. 6 illustrates light paths in the confocal condensing optical system according to Embodiment 2 of the present invention.

FIG. 6 illustrates light paths in the light scanning optical system according to Embodiment 2 of the present invention, which is designed for the wavelength of the point light source being 400 nm, and the numerical aperture NA of the confocal condensing optical system 35 being 0.68 on the object side.

Table 5 below lists the surface number #, beginning with the end surface of the optical fiber and proceeding in order to the object, the radius of curvature r (in mm) of each surface near the optical axis, the on-axis surface spacing d between surfaces, as well as the index of refraction $n_d$ and Abbe number $\upsilon_d$ (at the d-line) of the optical elements of Embodiment 2, with $n_{d5}$ being the index of refraction of the object and $\upsilon_{d5}$ being the Abbe number of the object. Those surfaces with a * to the right of the surface number # are aspheric, with the surface curvature being given by Equation (A) above, as defined by the aspheric constants listed in the lower portion of Table 5.

TABLE 5

| # | r | d | $n_d$ | $\upsilon_d$ |
|---|---|---|---|---|
| 1 | ∞ | 4.670625 | | |
| 2* | 0.55170 | 0.719068 | 1.73077 | 40.50 |
| 3* | −1.25520 | 0.142321 | | |
| 4 | −10.00000 | 0.300000 | 1.51630 | 64.10 |
| 5 | ∞ | 0.020000 | 1.33304 | 55.79 |
| 6 | ∞ (focal point) | | | |

| Aspheric constants: | | | | |
|---|---|---|---|---|
| Surface # 2 | | Surface # 3: | | |
| K | = −0.637006 | K | = 0.000000 | |
| $A_4$ | = −0.616966 × $10^{-1}$ | $A_4$ | = 0.164219 × $10^1$ | |
| $A_6$ | = 0.123589 | $A_6$ | = −0.570293 × $10^1$ | |
| $A_8$ | = −0.912655 | $A_8$ | = 0.999992 × $10^1$ | |
| $A_{10}$ | = 0.000000 | $A_{10}$ | = 0.000000 | |

In this embodiment as well, the distance from the center of rotation P (illustrated in FIG. 4) to the internal surface of the cover glass 36 (FIG. 6) when scanning is determined to be 10.0 mm. Moreover, surface #4 (i.e., the internal surface of the cover glass 36) is spherical and has a radius of curvature $r_4$ of −10.00000 mm. Therefore, in this embodiment as well, the center of curvature of surface #4 matches the center of rotation P (FIG. 4) of the scanning means.

Table 6 below shows the optical performance of Embodiment 2 at various scan angles θ. Rather than performing a straight line scan (i.e., in x-y coordinates), the scan may instead be circular arcs of varying radii of curvature. The optical performance values listed are the RMS wave surface aberration (in units of wavelength λ) at scan angles θ of 0.0°, 0.5°, 1.0°, and 1.5°. If the wave surface aberration value exceeds 0.07, degradation of resolution begins. The image of the point light source (i.e., the scanning spot) is scanned wherein scanning arcs of the scanning spot have radii of curvature of: 90 μm at θ=0.5°, 180 μm at θ=1.0°, and 270 μm at θ=1.5°.

TABLE 6

| θ: | 0° | 0.5° | 1° | 1.5° |
|---|---|---|---|---|
| RMS wave surface aberration (λ): | 0.012 | 0.012 | 0.015 | 0.021 |

Having the interior surface of the cover glass 36 always normal to the axis of the scanning beam enables good optical performance to be maintained throughout the entire scanning field.

Table 7 below shows the optical performance where a plane-parallel glass plate is substituted for the cover glass, with the value of $d_3$ changed to 0.130360 mm, and the value of $d_5$ (i.e., the working distance) changed to 0.032863 mm.

TABLE 7

| θ: | 0° | 0.5° | 1° | 1.5° |
|---|---|---|---|---|
| RMS wave surface aberration (λ): | 0.013 | 0.081 | 0.16 | 0.236 |

As is apparent from Table 7 above, the optical performance in this case is found to degrade considerably when increasing the scan angle θ.

Table 8 below shows the values of the product on the left side of Condition (1) for various values of scan angle θ. The listed values are for surfaces #4 and #5 of Embodiment 2, as well as for these same surfaces where a plane-parallel glass plate has been substituted for the cover glass 36 (FIG. 6).

TABLE 8

| θ: | 0° | 0.5° | 1° | 1.5° |
|---|---|---|---|---|
| Value of: $\|(\alpha)(NA)^4(d)(\Delta N)\|$ for surface #4 in Embodiment 2: | 0 | 0 | 0 | 0 |
| Value of: $\|(\alpha)(NA)^4(d)(\Delta N)\|$ for surface #5 in Embodiment 2: | 0 | $2.95 \times 10^{-4}$ | $5.89 \times 10^{-4}$ | $8.84 \times 10^{-4}$ |
| Value of: $\|(\alpha)(NA)^4(d)(\Delta N)\|$ for surface #4 if plane-parallel glass plate is substituted for cover glass 36 in Embodiment 2: | 0 | 0.0123 | 0.0246 | 0.0369 |
| Value of: $\|(\alpha)(NA)^4(d)(\Delta N)\|$ for surface #5 if plane-parallel glass plate is substituted for cover glass 36 in Embodiment 2: | 0 | $4.83 \times 10^{-4}$ | $9.66 \times 10^{-4}$ | $14.5 \times 10^{-4}$ |

On surface #4 (a spherical surface) of this embodiment, Condition (1) is satisfied for all scan angles θ because α equals zero (i.e., the optical axis of the collective optical system is always aligned with the surface normal of the spherical surface #4). On the other hand, on surface #4, in the case where a plane-parallel glass plate is substituted for the cover glass, Condition (1) is not satisfied because the scanning angle θ and the angle α are equal. As a result, optical performance may be significantly degraded in the case where a plane-parallel glass plate is substituted for the cover glass.

Embodiment 3

Figure 7:
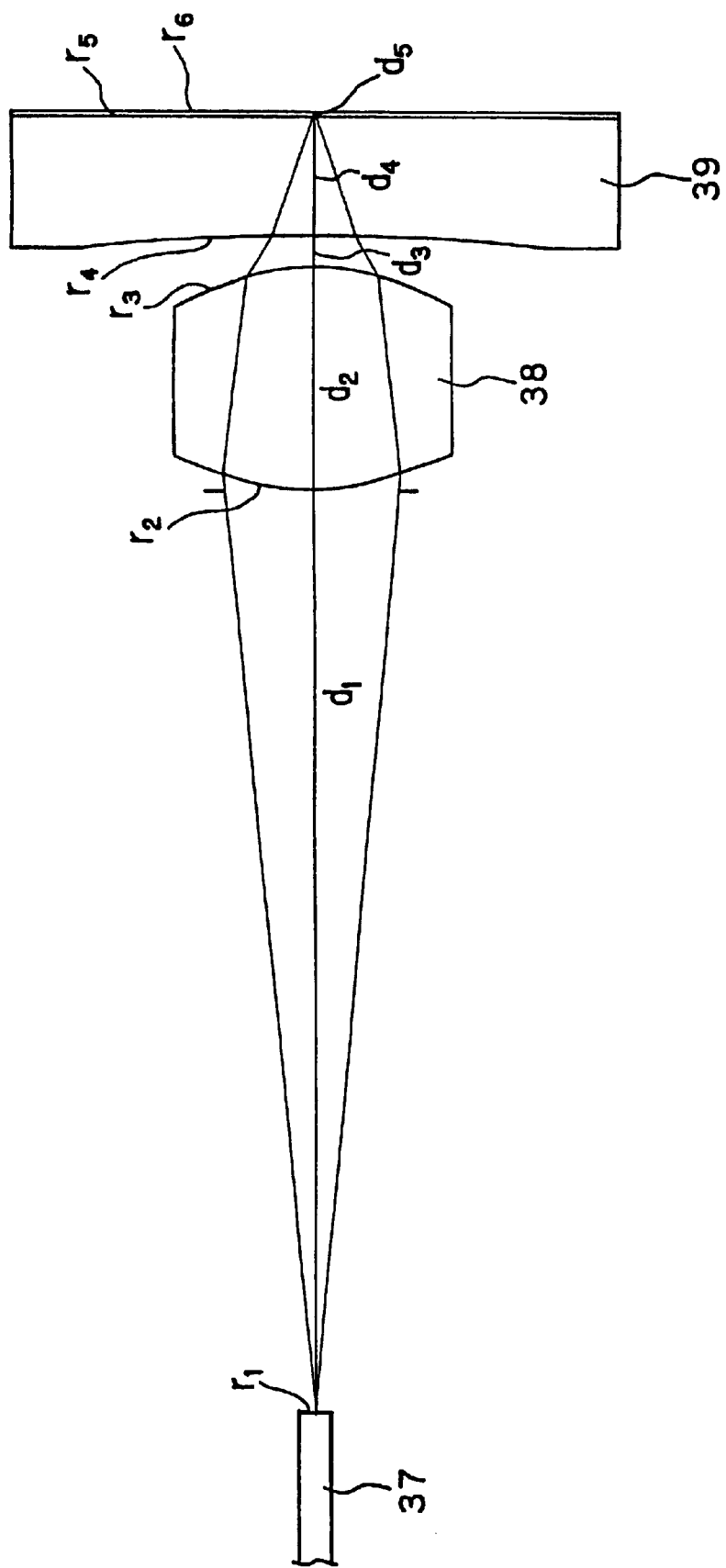
FIG. 7 illustrates light paths in the confocal condensing optical system according to Embodiment 3 of the present invention.

FIG. 7 illustrates light paths in the light scanning optical system according to Embodiment 3 of the present invention, which is designed for the wavelength of the point light source being 400 nm, and the numerical aperture NA of the confocal condensing optical system 38 being 0.49 on the object side.

Table 9 below lists the surface number #, beginning with the end surface of the optical fiber and proceeding in order to the object, the radius of curvature r (in mm) of each surface near the optical axis, the on-axis surface spacing d between surfaces, as well as the index of refraction $n_d$ and Abbe number $\upsilon_d$ (at the d-line) of the optical elements of Embodiment 3, with $n_{d5}$ being the index of refraction of the object and $\upsilon_{d5}$ being the Abbe number of the object. Those surfaces with a * to the right of the surface number # are aspheric, with the surface curvature being given by Equation (A) above, as defined by the aspheric constants listed in the lower portion of Table 9.

TABLE 9

| # | r | d | $n_d$ | $\upsilon_d$ |
|---|---|---|---|---|
| 1 | ∞ | 4.077695 | | |
| 2* | 0.91871 | 0.978514 | 1.81474 | 37.03 |
| 3* | −0.81039 | 0.133354 | | |
| 4 | −10.00000 | 0.500000 | 1.51630 | 64.10 |
| 5 | ∞ | 0.020000 | 1.33304 | 55.79 |
| 6 | ∞ (focal point) | | | |

Aspheric constants:

| Surface #2 | | | Surface #3: | | |
|---|---|---|---|---|---|
| K | = | 0.000000 | K | = | 0.000000 |
| $A_4$ | = | −0.356081 | $A_4$ | = | 0.932953 |
| $A_6$ | = | −0.411417 | $A_6$ | = | $-0.101942 \times 10^1$ |
| $A_8$ | = | 0.122207 | $A_8$ | = | 0.970944 |
| $A_{10}$ | = | 0.000000 | $A_{10}$ | = | 0.000000 |

In this embodiment as well, the distance from the center of rotation P (FIG. 4) to the internal surface of the cover glass 39 is 10.0 mm. Moreover, the surface $r_4$ is spherical and has a radius of curvature of −10.00000 mm. Therefore, in this embodiment as well, the center of curvature of the surface #4 matches the center of rotation P.

Table 10 below shows the optical performance of Embodiment 3 at various scan angles θ. Rather than performing a straight line scan (i.e., in x-y coordinates), the scan may instead be circular arcs of varying radii of curvature. The optical performance values listed are the RMS wave surface aberration (in units of wavelength λ) at scan angles θ of 0,0°, 0.5°, 1.0°, and 1.5°. If the wave surface aberration value exceeds 0.07, degradation of resolution begins. The image of the point light source (i.e., the scanning spot) is scanned wherein scanning arcs of the scanning spot have radii of curvature of: 90 μm at θ=0.5°, 180 μm at θ=1.0°, and 270 μm at θ=1.5°.

TABLE 10

| θ: | 0° | 0.5° | 1° | 1.5° |
|---|---|---|---|---|
| RMS wave surface aberration (λ): | 0.0 | 0.001 | 0.002 | 0.003 |

Table 11 below shows the optical performance where a plane-parallel glass plate is substituted for the cover glass 39, with the value of $d_3$ changed to 0.10012 mm, and the value of $d_5$ (i.e., the working distance) changed to 0.0564 mm. As is apparent from Table 11, the optical performance is found to be significantly degraded with increasing scan angle θ, especially where θ=1.5°.

TABLE 11

| θ: | 0° | 0.5° | 1° | 1.5° |
|---|---|---|---|---|
| RMS wave surface aberration (λ): | 0.000 | 0.04 | 0.08 | 0.12 |

In this embodiment as well, the interior concave surface of cover glass 39 is always normal to the optical axis of the scanning beam. Thus, α equals zero, and Condition (1) is satisfied. Therefore, the light scanning optical system can maintain good optical performance throughout the entire range of scanning angles θ.

Table 12 below shows the values of the product on the left side of Condition (1) for various values of scan angle θ. The listed values are for surfaces #4 and #5 of Embodiment 3, as well as for these same surfaces where a plane-parallel glass plate has been substituted for the cover glass 39 (FIG. 7).

TABLE 12

| θ: | 0° | 0.5° | 1° | 1.5° |
|---|---|---|---|---|
| Value of: $\|(\alpha)(NA)^4(d)(\Delta N)\|$ for surface #4 in Embodiment 3: | 0 | 0 | 0 | 0 |
| Value of: $\|(\alpha)(NA)^4(d)(\Delta N)\|$ for surface #5 in Embodiment 3: | 0 | $0.79 \times 10^{-4}$ | $1.58 \times 10^{-4}$ | $2.37 \times 10^{-4}$ |
| Value of: $\|(\alpha)(NA)^4(d)(\Delta N)\|$ for surface #4 if plane-parallel glass plate is substituted for cover glass 39 in Embodiment 3: | 0 | 0.00357 | 0.00714 | 0.0107 |
| Value of: $\|(\alpha)(NA)^4(d)(\Delta N)\|$ for surface #5 if plane-parallel glass plate is substituted for cover glass 39 in Embodiment 3: | 0 | $2.23 \times 10^{-4}$ | $4.47 \times 10^{-4}$ | $6.71 \times 10^{-4}$ |

On the other hand, where a plane-parallel glass plate is substituted for the cover glass 39, Condition (1) is not satisfied when the scanning angle is 1.5°. As a result, optical performance is degraded when the scanning angle is 1.5°.

Embodiment 4

Figure 8:
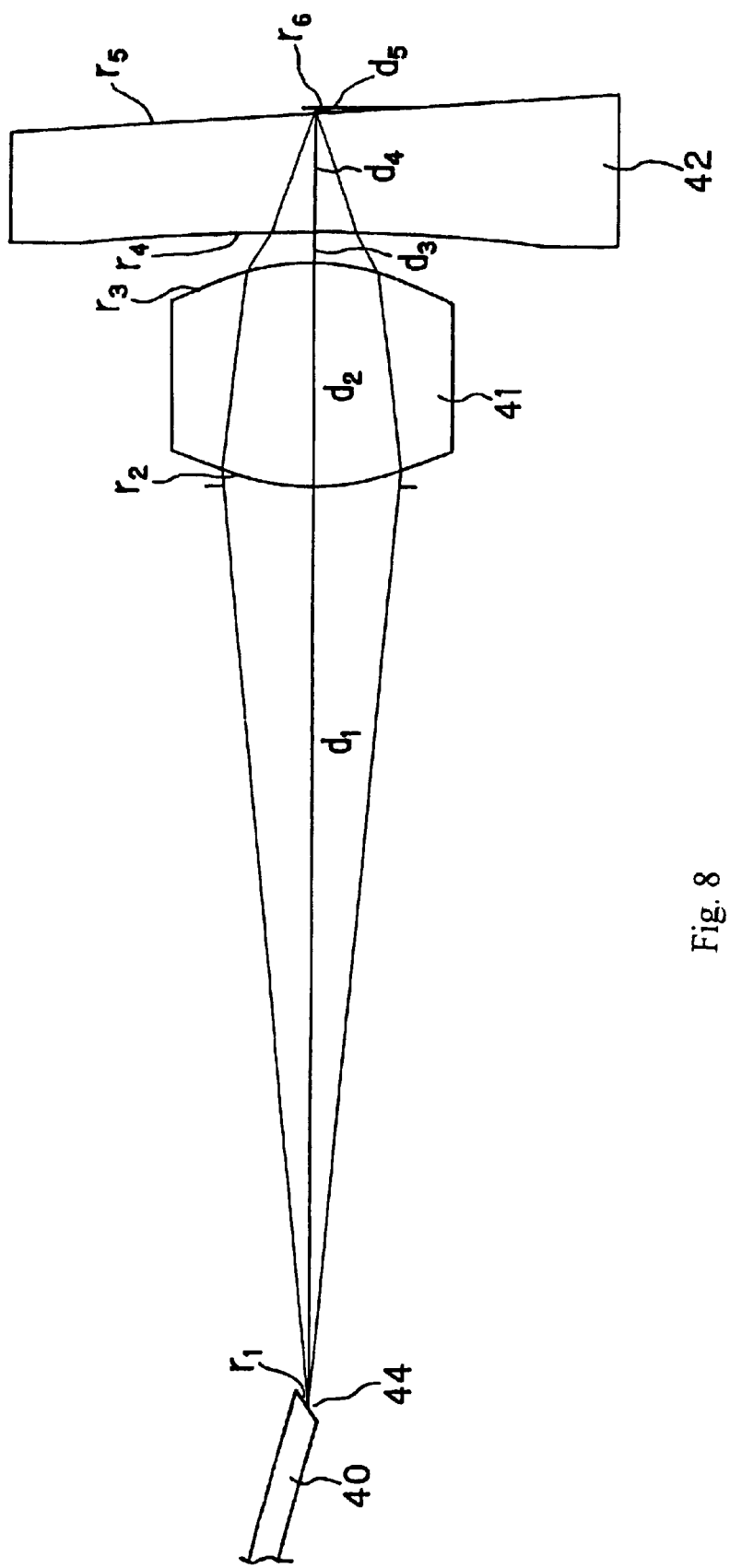
FIG. 8 illustrates light paths in the confocal condensing optical system according to Embodiment 4 of the present invention.

Embodiment 4 of the light scanning optical system of the present invention is shown in FIG. 8. The lens element data of this embodiment is the same as in Embodiment 3. This embodiment enables images to be obtained having a higher S/N ratio by eliminating stray light from being returned to the controller 5, as occurs in Embodiment 3. Generally speaking, in order to reduce stray light, one should avoid the return of any light back to the controller 5 that has not been reflected from the object of interest at the focal point of the confocal optical system. In the case of observing an object having a low reflectivity, such as living tissues, one or more countermeasures for reducing stray light is necessary. Two such countermeasures are illustrated in FIG. 8. First, the cover glass exterior surface (of radius of curvature $r_5$=infinity) is tilted about 4° so that light that reflects off this surface is not returned to the controller 5 (FIG. 1) via the optical fiber 40. The light does not return to fiber 40 because it is reflected to a position that is not aligned with the optical fiber end surface 44. This technique is especially important if the working distance is short (i.e., the distance $d_5$ from the exterior surface of the cover glass to the focal point), since the intensity of the light that is incident at the exterior surface of the cover glass will be very high, due to the focal point being so near to this surface. A second countermeasure that is illustrated in FIG. 8 is to arrange the end surface 44 of the optical fiber 40 at a substantial, non-normal angle to the longitudinal direction of the optical fiber 40. In this way, light from the light source that is reflected by the optical fiber end surface 44 is prevented from being returned to the controller 5 (FIG. 1), by virtue of the reflected light being outside the cone angle of light that the optical fiber is able to transmit effectively. In order to have the light which exits the optical fiber end 44 be aligned with the optical axis of the confocal condensing optical system 41, the longitudinal direction of the optical fiber 40 is canted so that the light beam emerges from the optical fiber end 44 aligned with the optical axis of the confocal condensing optical system 41.

On the other hand, on surface #5, the value of the left part of Condition (1) is 0.00179, which satisfies Condition (1). Therefore, optical performance is almost the same. Although not illustrated, placing a light shielding at the optical axis of the confocal condensing optical system 41 can reduce stray light components from degrading the image. Preferably, a shield having a diameter of about 100 μm should be placed on the optical axis of surface #2 of confocal condensing optical system 41 in order to block the axial light that is reflected off the surfaces of confocal condensing optical system 41 back to the optical fiber without reaching the object, so as to reduce the amount of stray light.

As discussed previously, in this embodiment, the end surface 44 of optical fiber 40 is cut at an oblique angle to the longitudinal direction of fiber 40 near the end surface 44. Preferably, the end surface 44 should be cut at an angle greater than that which the numerical aperture NA of the optical fiber 40 can transmit without leakage. By so doing, light reflected on end face 44 is leaked from the optical fiber 40, and thus the stray light due to reflection on the end surface 44 can be eliminated.

However, where the optical fiber end 44 is cut obliquely, light exiting from fiber 40 is refracted by the end surface so that it does not travel along the longitudinal direction of the fiber 40. Thus, in this embodiment, it is necessary that the optical fiber 40 near the optical fiber end 44 be oriented with its longitudinal direction at an oblique angle to the optical axis of the confocal condensing optical system 41 so that the refracted beam exiting the fiber 40 can be aligned with the optical axis of the condensing optical system 41. This enables the confocal condensing optical system 41 to have a high resolution and be inexpensive to manufacture, since it only needs to image rays emitted from an axial point.

As explained above, in this embodiment various countermeasures are used for reducing stray light so as to provide a high S/N ratio.

The surface shape of a cover glass is not limited to a spherical shape. By using an aspheric surface, degradation of optical performance coming from scanning can be minimized. In case there are different fixed edges in the X scanning direction and the Y scanning direction, it is desirable that the surface shape of the cover glass be an asymmetric shape for rotation. In case the fixed edge is de-centered off the optical axis of the confocal condensing optical system, the optical axis and a center of curvature should be de-centered.

Figure 9:
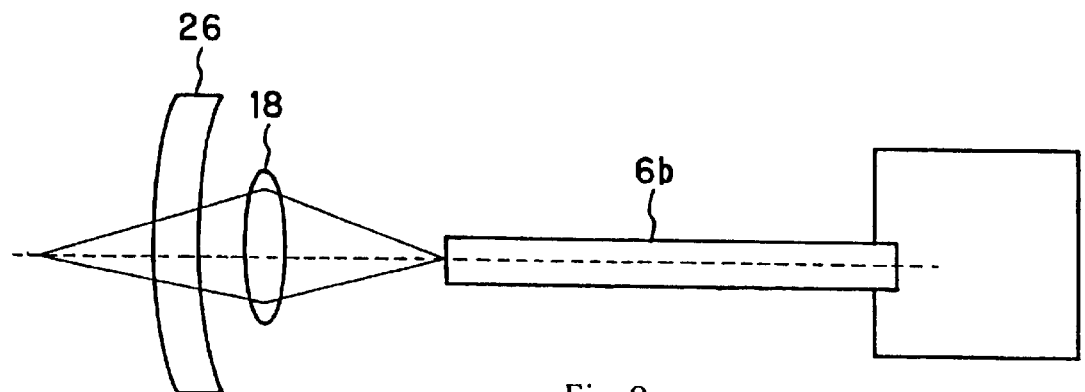
FIG. 9 illustrates a first alternative cover glass 26 that may be used in lieu of the cover glass 26 shown in FIG. 2.

As shown in FIG. 9, both surfaces of cover glass 26 can be spherical. Especially if the working distance (the distance from the object side of the cover glass 26 to the focal point) is long, such a design prevents degradation of optical performance due to scanning.

Figure 10:
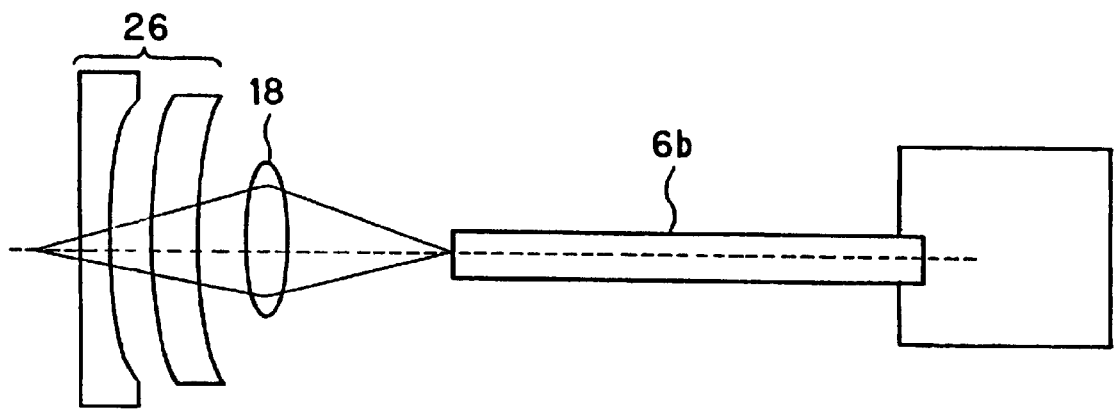
FIG. 10 illustrates a second alternative cover glass 26 that may be used in lieu of the cover glass 26 shown in FIG. 2.
Figure 11:
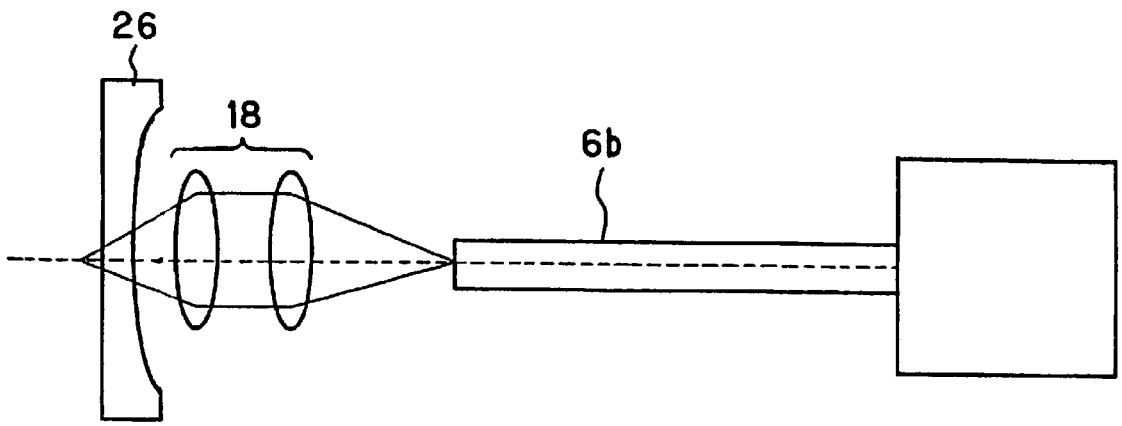
FIG. 11 illustrates a first alternative confocal condensing optical system 18 that may be used in lieu of the confocal condensing optical system 18 shown in FIGS. 9 and 10.

As shown in FIG. 10, cover glass 26 should preferably be formed of plural optical elements held within a frame. By using plural transmitting surfaces (spherical surfaces), aberrations generated by the cover glass 26 can be effectively reduced. Especially, if complicated scanning is necessary, for example, such as in the case of different fixed edges between the X-axis scanning direction and the Y-axis scanning direction, the cover glass preferably is made up of plural optical members within a frame.

As shown in FIG. 1 1, the confocal condensing optical system 18 may alternatively be formed of plural lens elements. Using plural lens elements facilitates even higher resolution in the confocal condensing optical system 18.

Figure 12:
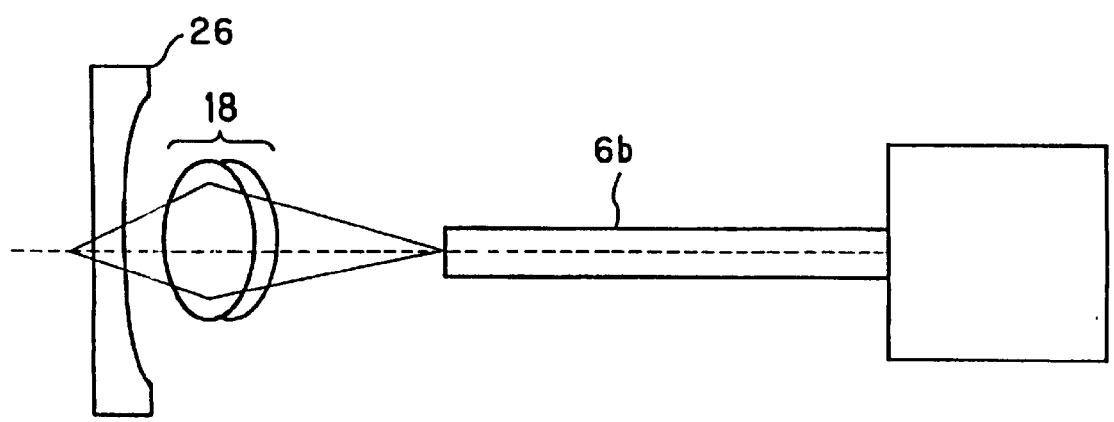
FIG. 12 illustrates a second alternative confocal condensing optical system 18 that may be used in lieu of the confocal condensing optical system 18 shown in FIGS. 9 and 10.

As shown in FIG. 12, the confocal condensing optical system 18 may alternatively be formed of two lens elements of opposite refractive power that are cemented together in order to reduce the chromatic aberration of the confocal condensing optical system 18. Through this modification, even if light with a different wavelength is used, collected light can be conducted well. Therefore fluorescence observation can be performed, wherein the wavelength of the illuminating light (i.e., the excitation wavelength) and the wavelength of the observation light (the fluorescence wavelength) are different. Chromatic aberrations can be controlled using diffractive optics, and the like, instead of a cemented lens.

Figure 13:
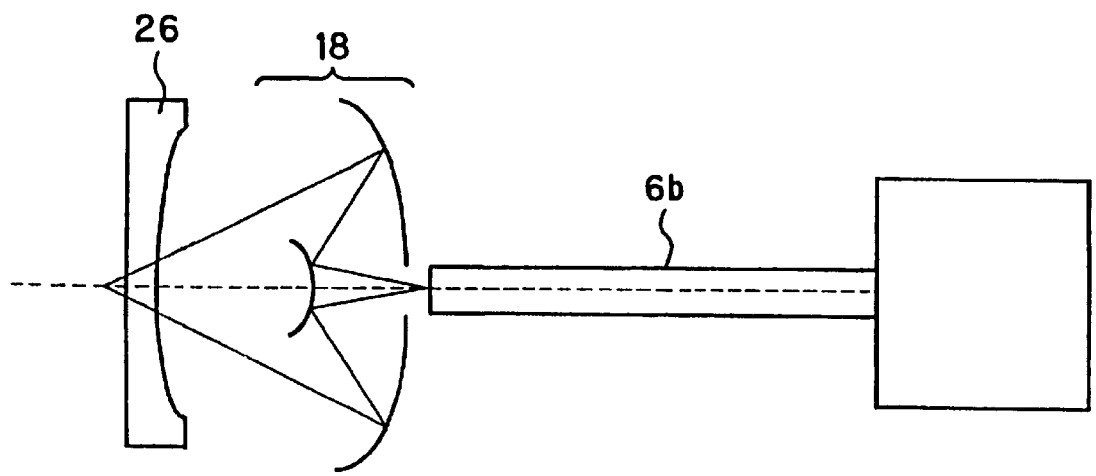
FIG. 13 illustrates a third alternative confocal condensing optical system 18 that may be used in lieu of the confocal condensing optical system 18 shown in FIGS. 9 and 10.

As shown in FIG. 13, a confocal condensing optical system 18 can alternately be formed of only a reflection surface. This does not produce chromatic aberrations in the confocal condensing optical system 18 and thus enables fluorescent observations, as mentioned above, to be performed. Since in this construction the light path is folded, the distance from the end surface of the optical fiber 6b to the confocal condensing optical system 18 can be short. Therefore, the actual distance in the longitudinal direction of the end unit 9 can be shortened.

Figure 14:
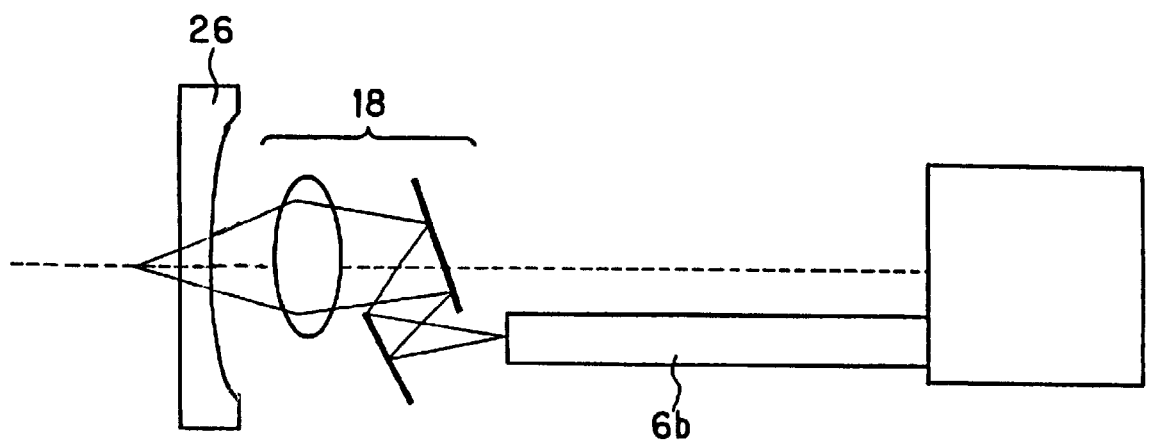
FIG. 14 illustrates a fourth alternative confocal condensing optical system 18 that may be used in lieu of the confocal condensing optical system 18 shown in FIGS. 9 and 10.

As shown in FIG. 14, the confocal condensing optical system 18 can include one or more reflective surfaces and a condensing lens. Since the light path is folded, the distance from the optical fiber end to the confocal condensing optical system 18 can be shortened. This enables the end unit 9 to be more compact in the longitudinal direction.

Figure 15:
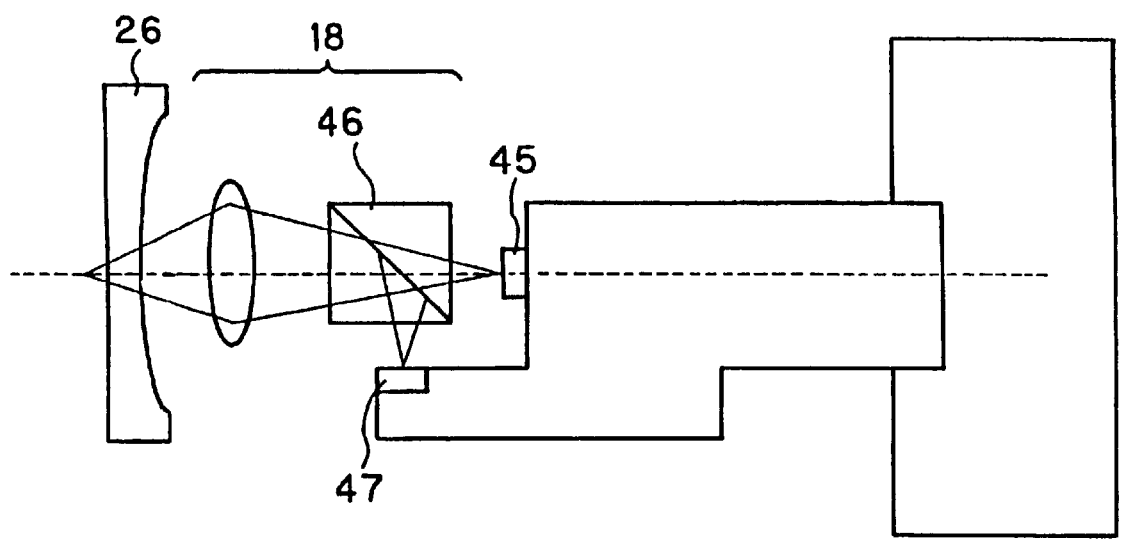
FIG. 15 illustrates a fifth alternative confocal condensing optical system 18 that may be used in lieu of the confocal condensing optical system 18 shown in FIGS. 9 and 10.

Other means can be employed in order to guide light from light source 2 to the end unit 9 and from the end unit 9 to the controller 5 via the optical fiber. For example, as shown in FIG. 15, a semiconductor laser 45, beam splitter 46 and photo detector 47 can be used. In this case, the beam splitter 46 is arranged along the optical axis of the confocal condensing optical system 18. Light from the semiconductor laser 45 is transmitted by the beam splitter 46 and is condensed onto an object via a cover glass 26. Reflective light from the object passes via the cover glass 26 and is collected by the confocal optical condensing system 18. The collected light is then reflected by the beam splitter 46 onto the photo detector 47. In this construction, scanning is performed by moving the confocal condensing optical system 18, semiconductor laser 45 and photo detector 47 as an integral unit.

The invention being thus described, it will be obvious that the same may be varied in many ways. For example, the scanning means can readily be controlled by the controller 5 so as to perform either arcuate scanning with different size arcs or straight line scanning of the object. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A light scanning optical system comprising:
a point light source;
a confocal condensing optical system which collects light from the point light source and forms an image of the point light source at or within an object, and which collects light from the object and condenses said collected light at the position of the point light source;
a cover glass which includes at least one optical surface having a negative refractive power, said cover glass positioned between the confocal condensing optical system and the object; and
a scanning means for moving, in at least one dimension, the point light source and the confocal condensing optical system as an integral unit.

2. The light scanning optical system according to claim 1, said scanning means moving the point light source and the confocal condensing optical system rotationally about a fixed point, and wherein the optical surface having negative refractive power is a concave, a center of curvature of said concave surface located so that the confocal condensing optical system substantially coincides with said fixed point.

3. The light scanning optical system according to claim 1, wherein the cover glass includes an aspheric surface.

4. The light scanning optical system according to claim 1, wherein the cover glass includes a surface that is rotationally asymmetric.

5. The light scanning optical system according to claim 1, wherein the confocal condensing optical system comprises plural lenses.

6. The light scanning optical system according to claim 1, wherein the confocal condensing optical system comprises lens elements that are cemented together.

7. The light scanning optical system according to claim 1, wherein the confocal condensing optical system includes a reflective surface.

8. The light scanning optical system according to claim 1, wherein the confocal condensing optical system includes a reflective surface as well as a condensing lens.

9. The light scanning optical system according to claim 1, wherein the cover glass comprises plural optical members.

10. A light scanning optical system comprising:
a point light source;
a confocal condensing optical system which collects light from the point light source and forms an image of the point light source at or within an object, and which collects light from the object and condenses said collected light at the position of the point light source;
a cover glass which includes at least one optical surface, said cover glass positioned between the confocal condensing optical system and the object; and
a scanning means for moving the point light source and the confocal condensing optical system as an integral unit;
wherein the following Condition (1) is satisfied:

$$|(\alpha)(NA)^4(d)\,(\Delta N)| < 0.01° \text{ mm} \quad \text{Condition (1)}$$

where
$\alpha$ is the angle of incidence of the optical axis of the scanning beam onto a selected optical surface of the cover glass;
NA is the numerical aperture of the confocal condensing optical system on the object side;
d is the air conversion distance (in mm) from the selected optical surface of the cover glass, along the optical axis of the scanning beam, to the conjugate point of the point light source; and
$\Delta N$ is the difference in refractive indexes of the media on opposite sides of the selected optical surface of the cover glass.

11. The light scanning optical system according to claim 10, said scanning means moving the point light source and the confocal condensing optical system rotationally about a fixed point, and wherein the optical surface is concave, a center of curvature of said concave surface located so that the confocal condensing optical system substantially coincides with said fixed point.

12. A light scanning optical system comprising:
a point light source;
a confocal condensing optical system which collects light from the point light source and forms an image of the point light source at or within an object, and which collects light from the object and condenses said collected light at the position of the point light source;
a cover glass located between the confocal condensing optical system and the object; and
a scanning means for moving the point light source and the confocal condensing optical system as an integral unit; wherein
a center axis of the light beam exiting said point light source is substantially aligned with the optical axis of the confocal condensing optical system, and
the point light source is formed by an end surface of the core of the optical fiber, said end surface being oriented obliquely to the longitudinal direction of the optical fiber near an end of the optical fiber, the longitudinal direction of the optical fiber near said end of the optical fiber being oriented so that a light beam exiting the optical fiber is refracted by the end surface so as to be directed substantially aligned with the optical axis of the confocal condensing optical system.

13. A light scanning optical system comprising:
a point light source;
a confocal condensing optical system which collects light from the point light source and forms an image of the point light source at or within an object, and which collects light from the object and condenses said collected light at the position of the point light source;
a cover glass located between the confocal condensing optical system and the object; and
a scanning means for moving the point light source and the confocal condensing optical system as an integral unit; wherein
a center axis of the light beam exiting said point light source is substantially aligned with the optical axis of the confocal condensing optical system, and
the surface of the cover glass nearest to the object is a planar, transmissive surface that is oriented at an oblique angle to the optical axis of the confocal condensing optical system.

14. The light scanning optical system according to claim 13, wherein the cover glass is formed of a plano-concave optical element.

* * * * *